United States Patent [19]
Phillips et al.

[11] Patent Number: 5,626,332
[45] Date of Patent: May 6, 1997

[54] VIBRATION ISOLATION SYSTEM USING PLURAL SIGNALS FOR CONTROL

[75] Inventors: Douglas J. Phillips, Melbourne; Gerry E. Riveros, Ihb; S. Richter; Dave Hyland, both of Melbourne Beach; John W. Shipley, Sebastian; S. Greeley, Rockledge, all of Fla.

[73] Assignee: Harris Corporation, Melbourne, Fla.

[21] Appl. No.: 281,982

[22] Filed: Jul. 29, 1994

[51] Int. Cl.⁶ ............................. F16F 9/50; F16M 13/00
[52] U.S. Cl. ................ 267/140.14; 248/550; 267/140.5
[58] Field of Search .................. 267/140.11, 140.15, 267/218, 140.13, 140.14, 140.3, 140.5; 248/562, 636, 550, 559, 583, 556, 566; 188/378–380

[56] References Cited

U.S. PATENT DOCUMENTS

| | | | |
|---|---|---|---|
| 5,052,510 | 10/1991 | Gossman | 267/140.11 X |
| 5,133,527 | 7/1992 | Chen et al. | 248/550 |
| 5,316,240 | 5/1994 | Girard et al. | 188/380 X |
| 5,332,203 | 7/1994 | Gossman et al. | 267/140.15 |
| 5,356,123 | 10/1994 | Hamada et al. | 267/140.14 |
| 5,374,025 | 12/1994 | Wherpley et al. | 188/378 X |
| 5,423,523 | 6/1995 | Gossman et al. | 267/140.15 |

*Primary Examiner*—Josie Ballato
*Attorney, Agent, or Firm*—Rogers & Killeen

[57] ABSTRACT

An active isolation device and method reduces the transmission of vibrations from interconnected elements. The device maintains a high stiffness between interconnected elements while actively reducing the transmission of relative movements, such as vibration. In one embodiment, the device uses accelerometers to measure the vibrations experienced by each of the interconnected elements and selectively operates an actuator between the two elements to maintain the position of one of the elements. In another embodiment, plural of the devices are used cooperatively to reduce the vibrations that would otherwise be transmitted from one element to a platform, permitting simultaneous control of multiple degrees of freedom of movement.

48 Claims, 6 Drawing Sheets

VIBRATION ISOLATION SYSTEM USING PLURAL SIGNALS FOR CONTROL

BACKGROUND OF THE INVENTION

The present invention relates in general to the reduction of the transmission of movement or vibrations between interconnected elements. In particular, the present invention is related to a device and method for actively controlling and reducing the transmission of unwanted vibrations between stiffly interconnected elements by responsively operating means to oppose the unwanted relative movement.

It is known that when two or more physical bodies or elements are interconnected, vibrations occurring on or being received by one body are transmitted to the second body, generally through the structures interconnecting the bodies. Examples abound, such as the transmission of the bumps in a road by the wheels to the cab of an automobile, or the transmission of the cycling of a refrigerator compressor to the frame and door of the refrigerator. Often, these transmissions are ignored and/or tolerated. Sometimes, designers attempt to reduce these vibrations (or at least their effects) by isolating one body from another. For example, both the wheels of the automobile and the compressor of a refrigerator are somewhat isolated from the remainder of their structures by the placement of springs between the source of the vibration and the remaining structure.

Additionally, other isolation devices are known, such as dampers, which "soften" the attachment of one body to another. In the present examples, automobiles usually use air pistons (called "shock absorbers") and refrigerator compressors are usually mounted on rubber pads.

In many applications, passive devices such as springs and dampers are adequate. However, in many applications, springs often introduce resonance effects which prevent proper operation of the system. Still in other systems, springs cannot reduce the transmission of vibrations sufficiently.

It is also known to isolate bodies by placing an intense magnetic field between the bodies. If one body generates the field and the other body reacts to the field, one of the bodies seems to levitate above the other. Bodies displaced by such magnetic levitation, however, generally collapse into each other if the power to generate the magnetic force is removed. In an attempt to reduce the coupling of vibrations between bodies separated by magnetic levitation, it is known to attempt to reduce the apparent stiffness between the bodies to zero; however, this technique is the equivalent to placing a small stiffness spring between the bodies, generally having the same problems as discussed above.

It is also known to provide passive viscous dampening devices in the load path between bodies. While these devices achieve some attenuation of the vibration, they generally do not prevent the transmission of the vibration.

The transmission of vibration between elements can be particularly harmful in certain environments. For example, artificial satellites often require considerable stability for pointing and measuring sensors; yet, such vehicles often also have inertial reaction wheels or reciprocating elements which regularly generate considerable amounts of vibration. In the relative vacuum of space, vibrations are not damped as they are on earth by a surrounding atmosphere and, accordingly, vibration problems are particularly difficult to remedy.

It is accordingly an object of the present invention to provide a novel device and method to obviate these and other vibration transmission problems in the prior art.

It is a further object of the present invention to provide a novel device and method to reduce the amount and severity of vibration transmitted between interconnected elements.

It is still another object of the present invention to provide a novel device and method for reducing inter-structural vibration while maintaining a stiff connection between structures.

It is yet another object of the present invention to provide a novel device and method to actively reduce vibration that would otherwise be transmitted between interconnected structures.

It is still a further object of the present invention to provide a novel device and method which reduces vibrations experienced in one direction relatively independently of vibrations experienced in other directions.

It is a still further object of the present invention to provide a novel device and method to actively reduce the transmission of inter-structural vibration while maintaining stability over a wide variety of conditions.

It is still another object of the present invention to provide a novel device and method which both reduces the transmission of inter-structural vibrations while permitting a selective alignment of the interconnected bodies.

The above and other objects, features and attendant advantages of the present invention will be more apparent from the following detailed description of the preferred embodiments of the invention taken, by way of example only, in conjunction with the accompanying drawings.

DESCRIPTION OF THE PREFERRED EMBODIMENTS

Figure 1:
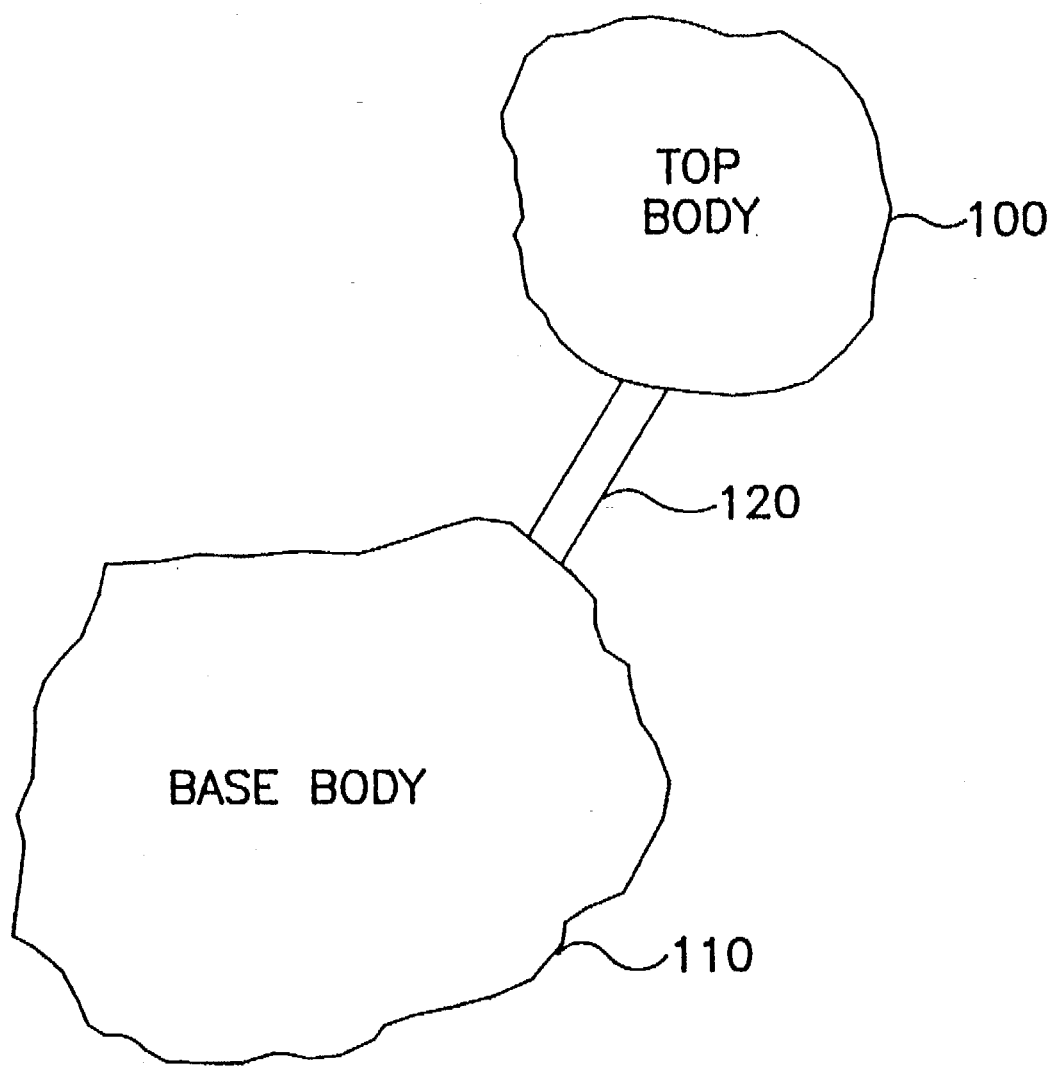
FIG. 1 is a representational pictorial diagram illustrating the concept of isolation between two elements.

With reference to FIG. 1, the present invention may find particular use in structures in which a top body 100 is attached to a base body 110 through a interconnection structure 120. For purposes of reference, it is often desirable to prevent vibrations or disturbances experienced in the base body 110 from being transmitted by the interconnection structure 120 to the top body 100. In accordance with the present invention, all or a portion of the interconnection structure 120 may be replaced with a device of the present invention to reduce the effects of disturbances in the base body 110 on the top body 100.

Figure 2:
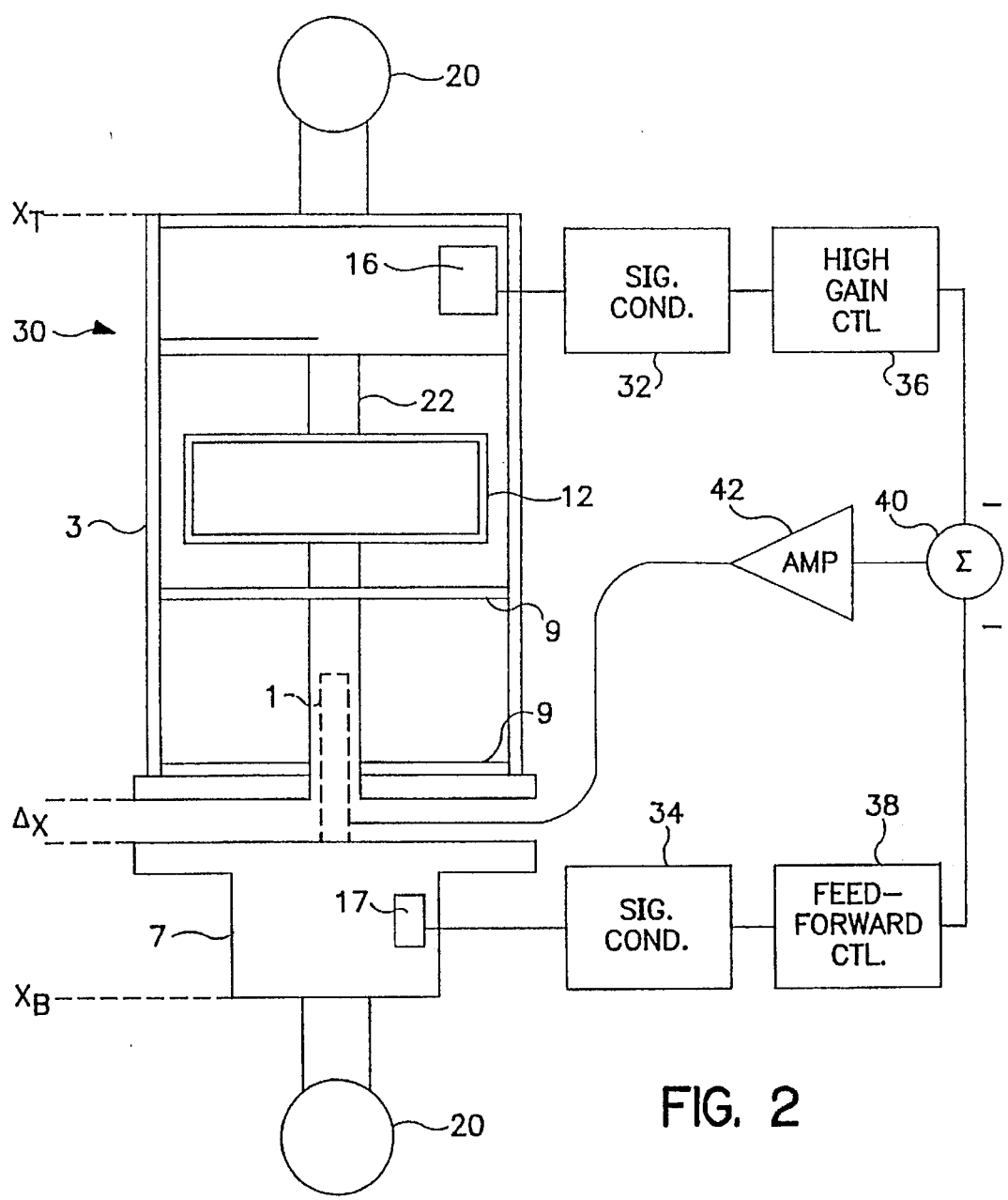
FIG. 2 is a functional block diagram showing an embodiment of the present invention.

With reference to FIG. 2, an active fitting device 30 in accordance with the present invention may include a base housing 7 which is connected to a base body (not shown) through a interconnection means 20 (which may be ball shaped and may be flexible) which mates with a cooperative means on the base body for attachment to the base body.

The active fitting device 30 may also include a top housing 3 which is connected to a top body (not shown) through a similar interconnection means 20 which mates with a cooperative means on the top body for attachment to the top body. Both interconnection means 20 may be shaped suitably to permit the ready transfer of forces and movements through the longitudinal axis of the device but to avoid the transfer of forces or movements not having a component along the longitudinal axis.

With continued reference to FIG. 2, the top housing may include a shaft 22 extending down from the interconnection means 20 toward the base housing, interrupted by a compliant element 12. The compliant element 12 may be formed from a closed cylinder of metal or other springy material and may be filled with a dampening fluid such as a viscoelastic polymer material. The dampening fluid may form a layer of dampening material in between the ends of the compliant element 12, as shown in FIG. 2. The shaft 22 may be retained by flexure fittings 9 which permit movement along the longitudinal axis of the device but which resist torsional and twisting forces which would tend to bend the shaft 22.

The bottom housing 7 may include a piezoelectric actuator 1 which may be moved selectively within the shaft 22 and along the longitudinal axis of the device.

The top housing 3 and the base housing 7 may each carry an accelerometer, 16 and 17 respectively, to measure accelerations along the longitudinal axis of the device. The measured accelerations may be filtered by conventional signal conditioning units 32, 34. The filtered signal from the top housing 3 may be applied to a high gain control circuit 36 to produce a feedback control signal. Likewise, the filtered signal from the accelerometer 17 in the base housing 7 may be supplied to a feedforward circuit 38 to provide a feedforward control signal. The feedback and feedforward control signals may be combined by a summer 40 and applied to the control of the actuator 1 through a signal amplifier 42.

In operation, the top housing 3 is attached to the top body (not shown), generally the body for which it is desired to eliminate vibrations. Similarly, the base housing 7 is attached to the base body (not shown). Together, through the actuator, the base housing 7 and the top housing 3 provide a stiff support for the top body.

If vibrations or other disturbances are sensed by the base accelerometer 17, a signal representing the acceleration is sent through the signal conditioner 34 to the feedforward control circuit 38. The feedforward control circuit 38 determines an appropriate control signal to transmit to the actuator to move the actuator in a direction opposite to the direction of the sensed vibration and of sufficient magnitude to result in little or no movement of the upper housing.

If vibrations or other disturbances are sensed by the top accelerometer 16, a signal representing the acceleration is sent through the signal conditioner 32 to the high gain feedback control circuit 36. The feedback control circuit 36 determines an appropriate control signal to transmit to the actuator to counteract the sensed vibration and sends the signal through the summer 40 and amplifier 42 to the actuator 1. Because the accelerometer 16 on the top housing is sensing accelerations which are occurring on the top body (i.e., the feedforward signal has not eliminated all the motion), the gain of the feedback control circuit is generally set very high (e.g. an order of magnitude or more higher than the feedforward circuit gain), as long as stability can be guaranteed.

With continued reference to FIG. 2, the effect of the device of the present invention is to vary the distance, delta-x, between the top housing 3 and the bottom housing 7, so that vibrations felt at the base housing (i.e., which move $X_B$) will not cause movement at the top housing (i.e., at $X_T$).

While the foregoing description has referred to a "top" housing as being the element whose movement is to be minimized, there is nothing in the present invention which limits such element to be a "top" element or any other physical orientation with respect to gravity or with respect to the location of the "base" element.

The high gain feedback control circuit may determine the position of the top housing 3 with respect to its original position by double integrating the accelerometer signal supplied to it. A conventional double integration of the accelerometer signal, however, may be impractical because the signal typically has an infinite DC gain. In place of the double integration, the control circuit may use a second order low pass filter after the DC effects of gravity have been biased out. Alternatively, but not required, the feedback control circuit 36 may use a third order high pass/low pass filter.

From any of the methods used in the feedback control circuit, an estimate of the position of the top housing 3 may be obtained. The feedback control circuit is designed to return the top housing 3 to its original position from (a) the position estimate and (b) from the transfer function of the top body. The feedback control circuit is designed using the mass properties of the top body (e.g., mass, moments of inertia) to determine as high a control signal as possible without going unstable. Note that to obtain such a control function, the user of the system does not need to know in detail the characteristics of the body being isolated from vibration. The control scheme applied by the high gain controller can be obtained from rough order mass properties such as mass and moments of inertia. Usually, a specific knowledge of the isolated body's modal properties is not necessary).

It is also possible for the high gain control and/or the feedforward control circuit to use adaptive control architecture and/or a adaptive neural control architecture to adaptively determine and apply a control scheme which successfully learns the system and determines the appropriate actuator control commands.

The feedforward control circuit 38 may be designed to account for the sensitivities and gains of the base accelerometer 17 and the actuator 1. Thus, non-linearities and phase delays in sensing and responding to the base accelerometer signals may be predictively eliminated in the feedforward control circuit.

Figure 7:
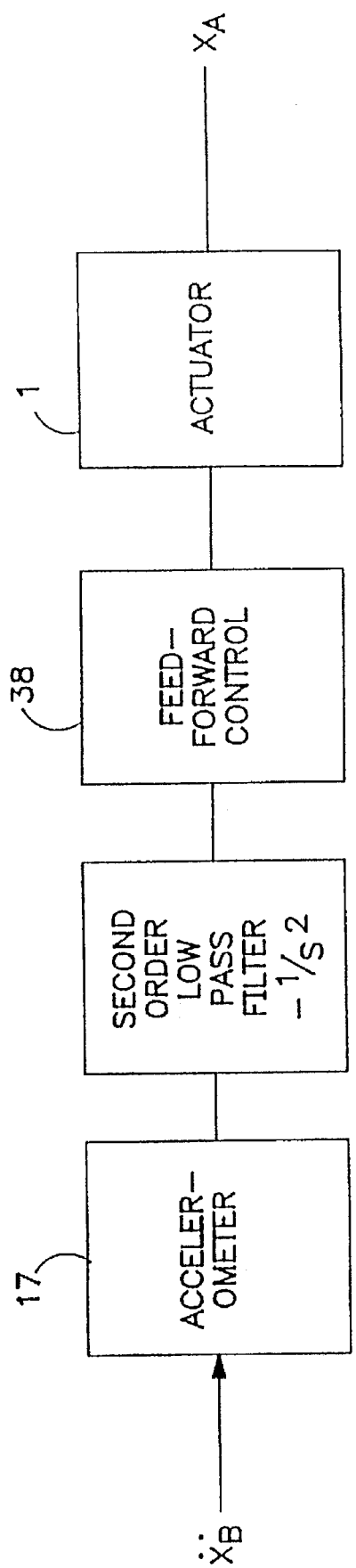

In a feedforward controller which may be used in the present invention, the controller can be made to compensate for the non-linearities and dynamics of the actuator and accelerometer. With reference to FIG. 7, the signal flow through the feedforward loop may be illustrated as an acceleration ($\ddot{X}_B$) of the body (along the direction of the accelerometer 17) which is sensed by the accelerometer 17, filtered, passed through the controller logic to determine the appropriate control signal which is then sent to the actuator (the summing, amplifying and effects of the feedback controller are not shown for simplicity). The control signal causes the actuator 1 to move (expand or contract in the preferred embodiment) resulting in a new position of the actuator, $X_A$. Specifically, the feedforward controller 38 may be tailored such that:

$$X_A/\ddot{X}_B = 1/S^2$$

i.e., that the transfer function ($1/S^2$) from the bottom displacement to the actuator displacement is equal to 1. In this way, the feedforward controller 38 compensates for any distortions and/or dynamics in the accelerometer 17 and/or the actuator 1. The actuator 1 may also not be moved selectively to compensate for vibration, in which case the actuator will act as a stiff passive member.

The compliant element 12 may be designed to reduce the transmission of high frequency vibrations to the top accelerometer 16. Specifically, the compliant element 12 may be designed to be relatively springy at high frequencies, isolating the top accelerometer 16 from those frequencies. Effectively, the compliant element 12 may serve as a type of mechanical filter which is able to sustain the loading of the device but which somewhat isolates the top accelerometer 16 from the movements of the actuator 1. While the compliant element is shown in the preferred embodiment as a closed cylinder or canister, other shapes which isolate the top accelerometer 16 at high frequencies but do not degrade overall isolation performance may be used. For example, the compliant element 12 could also comprise a flattened band of metal having a flattened oval shape, with or without dampening material in the center of the band or applied to the outside of the band.

Alternatively, the compliant element 12 can be constructed from alternating layers of springy and dampening material in plate form. The shape of the plates in such a compliant element 12 may be any desired shape; i.e., circular, ovular, etc.

The applicants have found that the actuator 1 may be a linear actuator, sold by Physics Instruments as the P-842.xx and P-843.xx LVPZ Translators and that the accelerometers may be Model QA-700 accelerometers marketed by Sundstrand.

Figure 3:
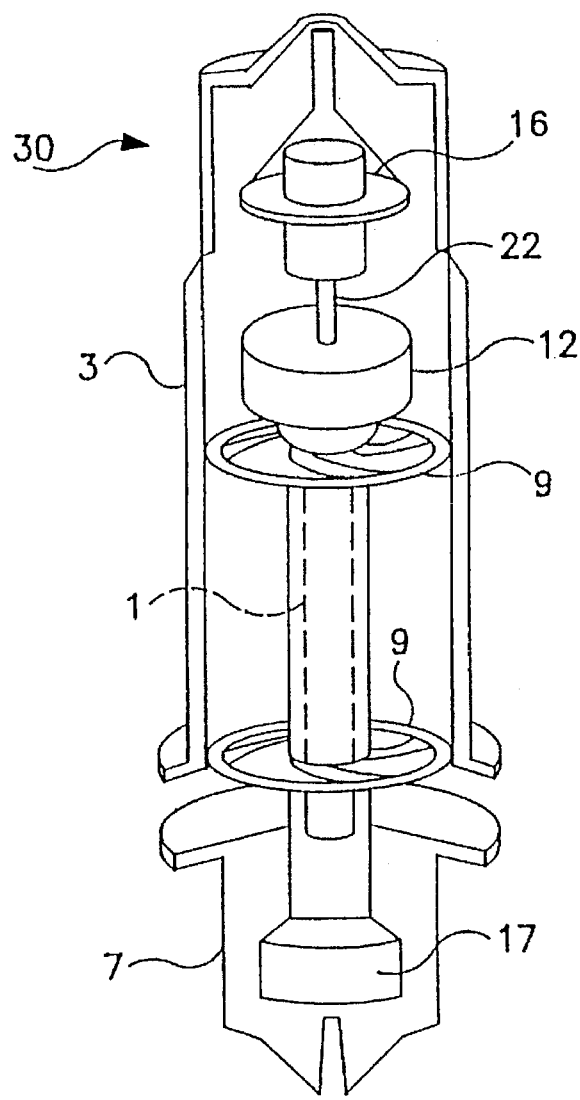
FIG. 3 is a partially cut-away pictorial representation of a further embodiment of the present invention.

With reference to FIG. 3, in which like elements have been given like reference numerals to those used in FIG. 2, the flexure fittings 9 may be oriented with respect to the shaft of the actuator 1 so that the inner portion of the fitting 9 is attached to the shaft and the outer portion of the fitting 9 is attached to the housing 3. In this position, the flexure fitting 9 is able to resist the application of moments to the actuator while providing very little spring resistance to the movement of the components of the device in the longitudinal direction. The flexure fittings 9 carry only a slight amounts of the longitudinal load because they are very weak springs in the longitudinal direction of the device.

Figure 4:
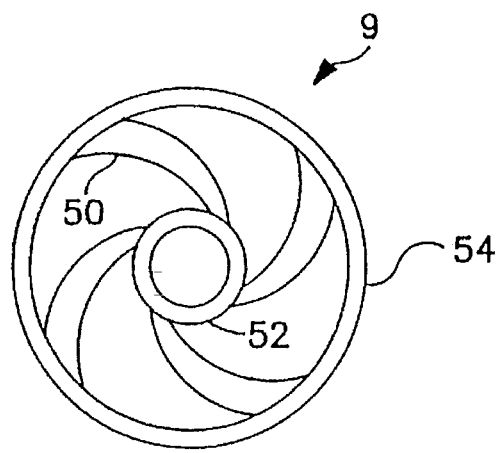
FIG. 4 is a pictorial diagram of a flexure apparatus which may be used in the present invention.

With reference to FIG. 4, the flexure fittings 9 may include plural S-shaped spokes 50 emanating from an inner ring 52 and terminating in an outer ring 54 of the fitting 9. The thickness of the fitting 9 is generally quite thin to avoid applying additional springiness to the device. As an alternative arrangement, the fittings 9 could be formed from a flat piece of metal into which weakening holes are drilled throughout the flat sides.

Figure 5:
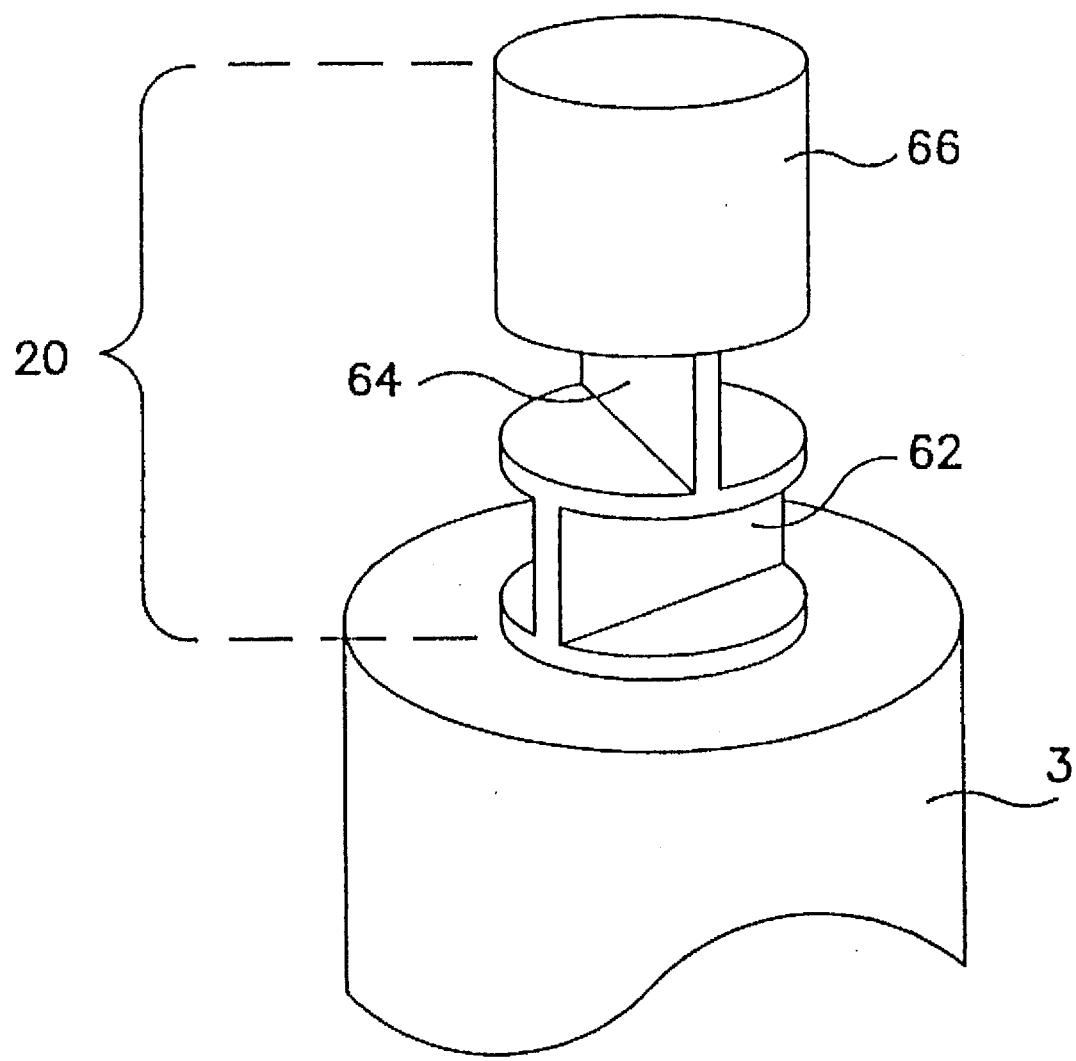
FIG. 5 is a pictorial diagram of an end fitting which may be used in the present invention.

With reference to FIG. 5, the interconnection means 20 of the present invention may include planar tabs 62, 64 which are mounted in an alternatingly perpendicular series on the end of either housing (top housing 7 shown) and a connection ring 66 affixed to the end of the series of tabs. In operation, the connection ring 66 is securely attached to the top body or base body. Because the planar tabs are relatively thin, they will readily transmit forces (and movements) only through the line going through the longitudinal axis of the device. Forces from other directions will tend to bend the tabs or the connection of the tabs to the adjacent structure so that the active fitting devices will be able to operate along a single axis, substantially independently.

Figure 6:
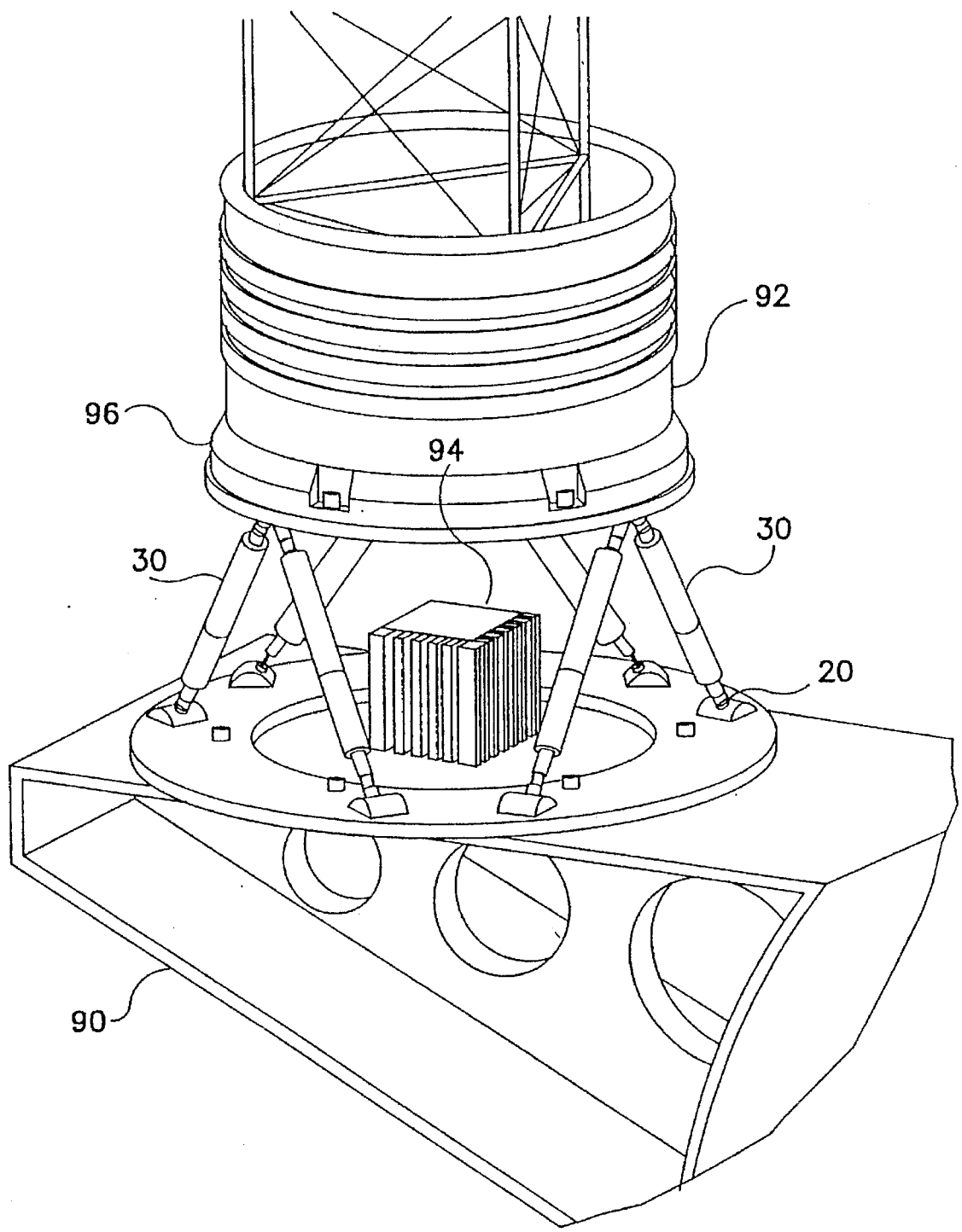
FIG. 6 is a pictorial diagram of another embodiment of the present invention formed from the use of active fittings in accordance with the present invention; and, FIG. 7 is a simplified block diagram of a feedforward control loop which may be used in the embodiment of FIG. 2.

With reference to FIG. 6, plural active fittings of the present invention may be used cooperatively to form a stable platform which is free to move in 6 degrees of freedom about its base. A base 90 carries six active fittings 30 which interconnect the base 90 to a top body 92 which is to be isolated from the vibrations in the base 90. The fittings 30 may be mounted in sets of two co-planar active fittings 30. Use of plural sets of active fittings 30 increases the number of degrees of freedom of movement of the top body 92 about the base 90. For example, the three sets of active fittings 30 shown in the platform of FIG. 6 permit 6 degrees of freedom. In this configuration, the ring to which the fittings 30 and the top body are attached may be considered a stable platform 96.

Use of the active fittings 30 of the present invention permit each active fitting 30 to be operated independently of the other active fittings 30 in the platform. Thus, each fitting can have its independent set of control circuits, contained in a central module 94, which independently control its device without reference to the actions of the other active fittings. Such use of independent active fittings 30 makes for the easy control of the stable platform 96 since cross coupling effects of the various active fittings do not need to be separately addressed.

With continued reference to FIG. 6, the platform arrangement of plural sets of active fittings also permits the active fittings to be used as a pointing device to point the top body 92 relative to the base 90. By biasing one or more of the active fittings 30, the stable platform 96 can be forced to have an attitude which is not parallel to the plane of the base 90 and the control circuits of the active fittings 30 will attempt to maintain the stable platform 96 that attitude.

In another embodiment, if linear actuators are used, they can be stacked two or more in series to obtain additional ability to move and yet to maintain a stiff connection between the top body and the base body.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. An apparatus for isolating an element from vibrations experienced in a base element to which the element is attached, comprising:

first vibration measurement means producing a signal related to the vibration experienced by said base element;

second vibration measurement means producing a second signal related to vibrations experienced by said element;

actuator means for selectively changing the separation between said element from said base element; and, control means for selectively operating said actuator means responsively to said signal and to said second signal to reduce the transmission of vibration between said element and said base element.

2. The apparatus of claim 1 wherein said actuator means comprises a linear actuator.

3. The apparatus of claim 1 wherein said control means comprises a feedback loop related to said signal and to a first gain.

4. The apparatus of claim 3 wherein said control means comprises a second feedback loop related to said second signal and a second gain.

5. The apparatus of claim 4 wherein said second gain substantially exceeds said first gain.

6. The apparatus of claim 5 wherein said second gain exceeds said first gain by at least one order of magnitude.

7. The apparatus of claim 1 wherein said first measurement means is an accelerometer.

8. The apparatus of claim 1 further comprising a shock absorbing means cooperating with said actuator means.

9. The apparatus of claim 8 wherein said shock absorbing means comprises a spring element and a dampening element.

10. The apparatus of claim 9 wherein said shock absorbing means comprises a hollow closed housing of an elastomeric material filled with a dampening material.

11. The apparatus of claim 10 wherein said dampening material comprises a viscoelastic polymer layer.

12. The apparatus of claim 8 wherein said shock absorbing means is located between said element and said actuator.

13. The apparatus of claim 8 wherein said shock absorbing means is located between said second element and said actuator.

14. An apparatus for isolating an element from movements experienced in a base element to which the element is attached, comprising:

first movement measurement means producing a signal related to the movement experienced by said base element;

second movement measurement means producing a second signal related to the movement experienced by said element;

actuator means for selectively mutually displacing said element from said base element; and, control means for selectively operating said actuator means responsively to said signal and to said second signal to reduce the movement of said element.

15. The apparatus of claim 14 wherein said actuator means comprises a linear actuator.

16. The apparatus of claim 15 wherein said linear actuator provides a high stiffness between said element and said base element.

17. The apparatus of claim 14 wherein said control means includes electrically powered components.

18. The apparatus of claim 17 wherein said actuator means operates as a stiff passive member when not being operated by said control means.

19. A vibration attenuation device comprising plural active isolation fittings arranged between an element and a base element to provide six degrees of freedom of movement of said element relative to said base element, each of said fittings comprising:

first movement measurement means producing a signal related to the movement experienced by said base element;

second movement measurement means producing a second signal related to the movement experienced by said element;

actuator means for selectively changing the separation between said element from said base element; and, control means for selectively operating said actuator means responsively to said signal and to said second signal to decrease the separation between the element and the base element when said first and second movement measurement means indicate the element and base element are moving toward each other, and to increase the separation between the element and the base element when said first and second movement measurement means indicate the element and base element are moving away from each other.

20. The vibration attenuation device claim 19 wherein said active isolation fittings are mounted to said base element in plural coplanar pairs.

21. The apparatus of claim 19 wherein said plural active isolation fittings further comprise means for selectively aligning said element relative to said base element.

22. A high stiffness active isolation device for reducing the vibrations transmitted between stiffly connected first and second elements, comprising:

first and second flexible interconnection means, said first means interconnecting the first element to a first end of the device and said second means interconnecting said second element to a second end of the device, both said interconnection means stiffly operating in a first direction and loosely operating in directions perpendicular to said first direction;

first measurement means, positioned to measure movements along said first direction at said first end of the device and providing a first signal related thereto;

second measurement means, positioned to measure movements along said first direction at said second end of the device and providing a second signal related thereto;

first and second signal conditioning means filtering respectively said first and second signals;

a high gain controller producing a feedback control signal from said first signal;

a feedforward controller producing a feedforward signal from said second signal;

control means combining said feedback control signal and said feedforward signal to produce a control signal;

actuator means responsive to said control signal to relatively displace said first and second elements along said first direction.

23. The device of claim 22 wherein said actuator means stiffly maintains the relatively displaced position.

24. The device of claim 22 further comprising a shock absorber located between said first end and said actuator means.

25. The device of claim 24 wherein said shock absorber comprises a spring element and a dampening element.

26. The device of claim 25 wherein said spring element is a metal canister and said dampening element is a viscous dampening fluid carried within said canister.

27. The device of claim 24 wherein said shock absorber comprises alternating layers of a spring material and a dampening material.

28. The apparatus of claim 22 wherein said actuator means comprises a linear actuator.

29. The apparatus of claim 28 wherein the gain of said feedback controller exceeds the gain of said feedforward controller.

30. The apparatus of claim 29 wherein the gain of said feedback controller exceeds the gain of said feedforward controller by at least one order of magnitude.

31. The apparatus of claim 30 wherein said first measurement means is an accelerometer.

32. The device of claim 31 wherein said actuator means stiffly maintains the relatively displaced position.

33. The device of claim 32 further comprising a shock absorber located between said first end and said actuator means.

34. The device of claim 33 wherein said shock absorber comprises a spring element and a dampening element.

35. The device of claim 34 wherein said spring element is a metal canister and said dampening element is a viscous dampening fluid carried within said canister.

36. The device of claim 35 wherein said shock absorber comprises alternating layers of a spring material and a dampening material.

37. The apparatus of claim 22 wherein the gain of said feedback controller exceeds the gain of said feedforward controller.

38. The apparatus of claim 22 wherein the gain of said feedback controller exceeds the gain of said feedforward controller by at least one order of magnitude.

39. The apparatus of claim 22 wherein said first measurement means is an accelerometer.

40. The device of claim 22 wherein at least one of said flexible interconnection means comprise a ball.

41. The device of claim 22 wherein at least one of said flexible interconnection means comprise a series of two or more alternatingly perpendicular planar elements.

42. The device of claim 41 wherein a line along said first direction lies within each of the planes of said planar elements.

43. The device of claim 22 wherein at least one of said flexible interconnection means is relatively stiff in said first direction.

44. An apparatus for isolating an element from vibrations experienced in a base element to which the element is attached, comprising:

a base housing carrying,
(1) a means for connecting said base element to said base housing,
(2) an actuator means for selectively displacing said element from said base element, and
(3) a first vibration measurement means for producing a first signal related to vibration experienced by said base element;

a top housing carrying,
(1) a means for connecting said element to said top housing, and
(2) a second vibration measurement means for producing a second signal related to vibrations experienced by said element; said top housing internally including,
(3) a longitudinally compliant element for attenuating the transfer of vibrations between the base element and the element, and
(4) a shaft connecting said top housing, said compliant element, and said actuator means in a longitudinal arrangement; and, control means for selectively operating said actuator means responsively to said signal and to said second signal to reduce the transmission of vibration between said element and said base element.

45. The apparatus of claim 44 further comprising a flexible fitting means for maintaining a coaxial relationship between said shaft and said top housing.

46. The apparatus of claim 45 wherein said flexible fitting means comprises an inner portion in contact with said shaft, an outer portion in contact with said top housing, and plural curved members connecting said inner and outer portions.

47. An apparatus for isolating an element from vibrations occurring at a base element by detecting the vibrations and displacing said element to negate any displacement the element would experience as a result of said vibrations, comprising:

an apparatus body having a first end connected to said element and a second end connected to said base element; and first and second vibration measurement means for detecting said vibrations connected to said body first and second ends, respectively, wherein said first and second vibration measurement means produce signals for controlling the displacement of said element.

48. An apparatus for isolating an element from vibrations occurring at a base element by detecting the vibrations and displacing said element to negate any displacement the element would experience as a result of said vibrations, comprising:

an apparatus body having a first end connected to said element and a second end connected to said base element;

a piezoelectric linear actuator for actively displacing said element in response to the detection of said vibrations; and a compliant element for passively attenuating said vibrations, wherein said compliant element and said linear actuator are coaxial with and contained within said body.

* * * * *